(12) United States Patent
Carideo et al.

(10) Patent No.: US 8,708,708 B1
(45) Date of Patent: Apr. 29, 2014

(54) RESPIRATOR TEST ACCESSORY

(75) Inventors: Max Carideo, St. Paul, MN (US); Ricky L. Holm, White Bear Lake, MN (US); Stuart J. Olstad, Plymouth, MN (US); Richard Remiarz, Vadnais Heights, MN (US)

(73) Assignee: TSI, Inc., Shoreview, MN (US)

( * ) Notice: Subject to any disclaimer, the term of this patent is extended or adjusted under 35 U.S.C. 154(b) by 852 days.

(21) Appl. No.: 12/826,197

(22) Filed: Jun. 29, 2010

Related U.S. Application Data

(60) Provisional application No. 61/221,445, filed on Jun. 29, 2009, provisional application No. 61/221,448, filed on Jun. 29, 2009.

(51) Int. Cl.
*G09B 23/00* (2006.01)
*G01M 3/02* (2006.01)

(52) U.S. Cl.
USPC ............................................. 434/270; 73/40

(58) Field of Classification Search
USPC ............... 73/40; 128/201.22, 201.23, 202.22, 128/206.24, 206.25, 206.27; 434/262, 267, 434/270
See application file for complete search history.

(56) References Cited

U.S. PATENT DOCUMENTS

| | | | |
|---|---|---|---|
| 2,764,505 A | 9/1956 | Kilbourne, Jr. et al. | |
| 3,484,337 A | 12/1969 | Starita | |
| 3,486,366 A * | 12/1969 | Jackson | ............................ 73/40 |
| 3,514,314 A | 5/1970 | Nemeth | |
| 3,856,731 A | 12/1974 | Shinomura | |
| 4,180,490 A | 12/1979 | Maclean | |
| 4,691,556 A | 9/1987 | Mellander et al. | |
| 4,796,467 A * | 1/1989 | Burt et al. | ....................... 73/168 |
| 4,808,323 A | 2/1989 | Fisher et al. | |
| 5,289,819 A * | 3/1994 | Kroger et al. | ............ 128/200.24 |
| 5,296,129 A | 3/1994 | Ikeda et al. | |
| 5,808,182 A | 9/1998 | Stumpf | |
| 6,435,009 B1 | 8/2002 | Tilley | |
| 6,639,003 B2 | 10/2003 | Brosinger et al. | |
| 6,733,507 B2 | 5/2004 | McNicholas et al. | |
| 7,671,124 B2 | 3/2010 | Tsujimoto et al. | |
| 7,988,452 B2 | 8/2011 | Eiwen et al. | |
| 2007/0088291 A1 | 4/2007 | Weilbacher | |

(Continued)

FOREIGN PATENT DOCUMENTS

EP  1 462 130 B1  9/2004

OTHER PUBLICATIONS

Air Techniques Int'l, photograph A1 of head form and bladder, manufactured and sold by Air Techniques Int'l, a division of Hamilton Associates, Inc., of Baltimore, MD; device sold prior to Jun. 2008.

(Continued)

*Primary Examiner* — Daniel S Larkin
(74) *Attorney, Agent, or Firm* — Patterson Thuente Pedersen, P.A.

(57) ABSTRACT

A head form for testing a variety of respirators. The head form can prevent false leak failures by having a mask registration member upon which the mask under test is mounted, the mask registration member being self lubricating. In one embodiment, the registration member is an inflatable bladder. The bladder can be configured to limit lift away of the inflatable bladder from the recess, thereby mitigating leaks in the head form assembly. The bladder may be configured to limit roll away of portions of the bladder that register against the head form, thereby reducing or eliminating leaks between the inflatable bladder and the mask under test.

15 Claims, 7 Drawing Sheets

(56) References Cited

U.S. PATENT DOCUMENTS

| | | |
|---|---|---|
| 2007/0125164 A1 * | 6/2007 | Zielinski et al. ............... 73/167 |
| 2009/0099286 A1 | 4/2009 | Park |
| 2009/0209877 A1 * | 8/2009 | Zhang et al. ................. 600/529 |
| 2011/0138884 A1 * | 6/2011 | Hanson et al. .................... 73/40 |

OTHER PUBLICATIONS

Air Techniques Int'l, photograph A2 and A3 of head form and bladder, manufactured and sold by Air Techniques Int'l, a division of Hamilton Associates, Inc., of Baltimore, MD; device solf prior to Jun. 2008.

* cited by examiner

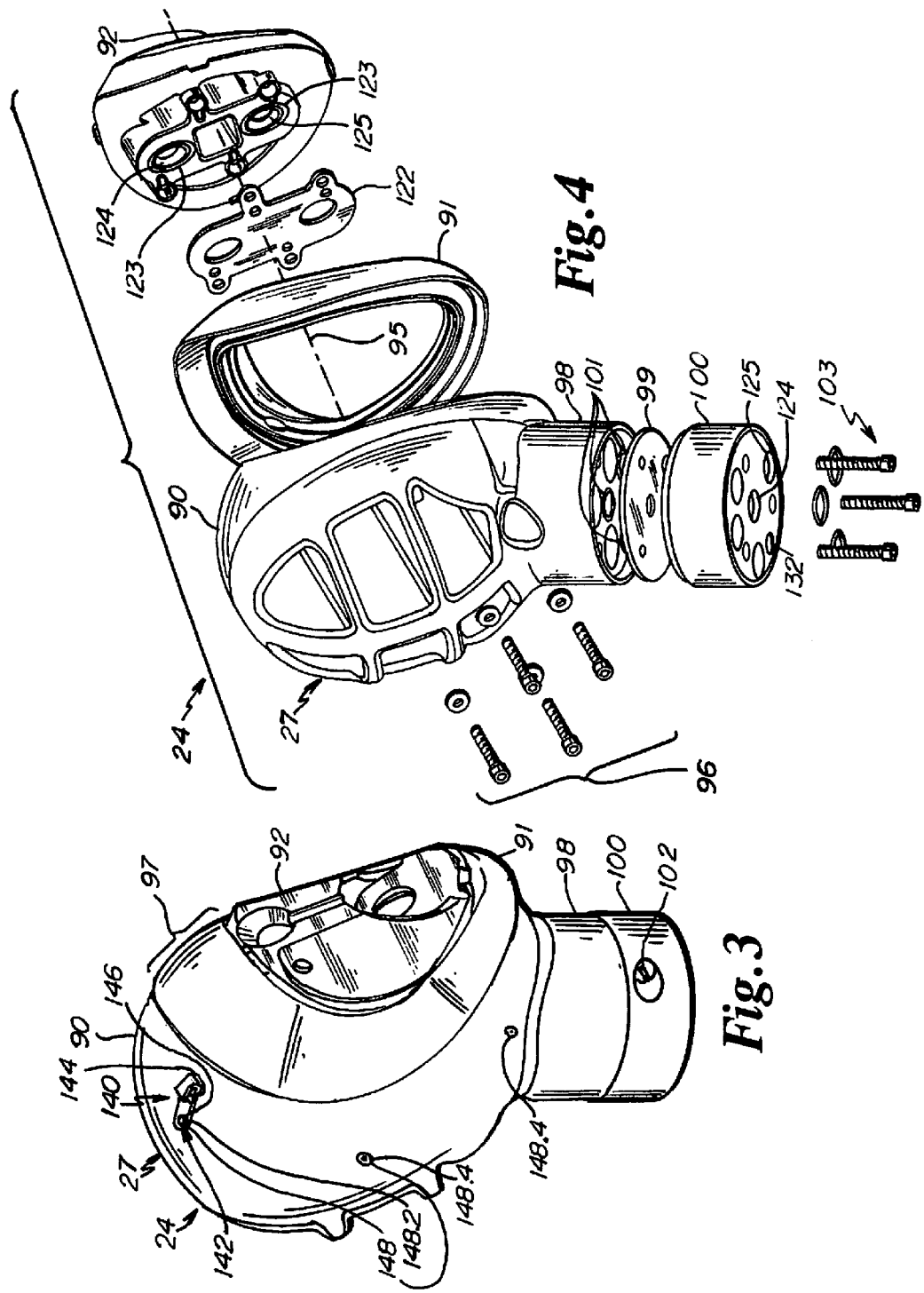

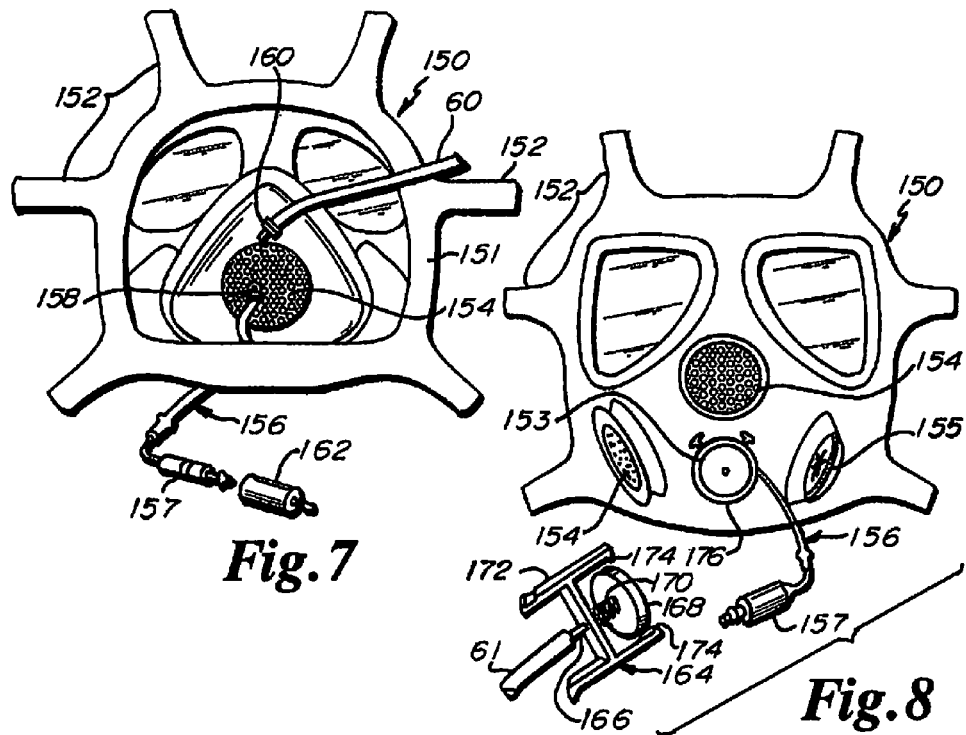
Fig.7
Fig.8
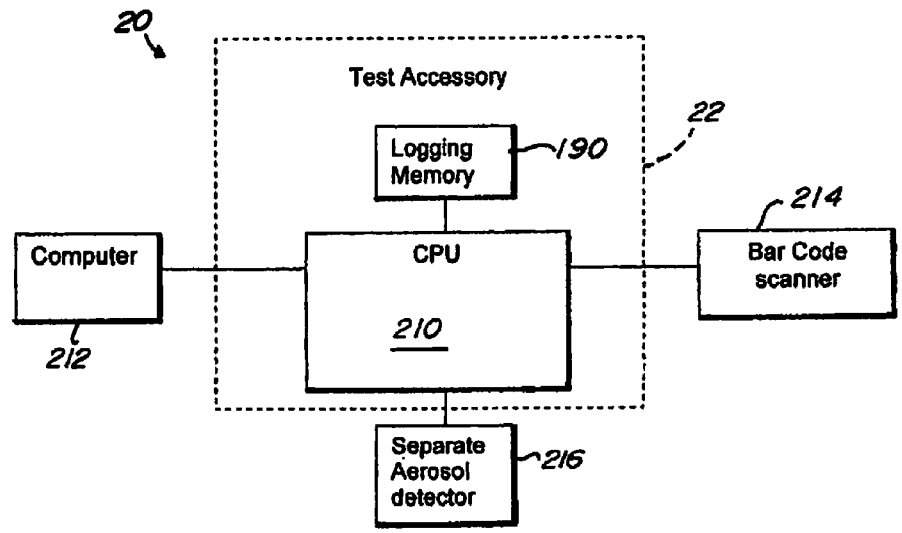
Fig.10

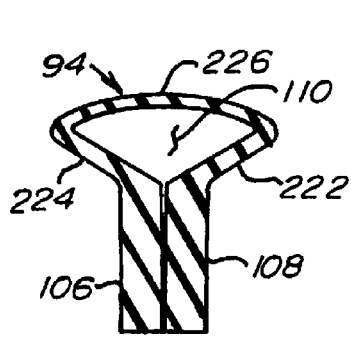
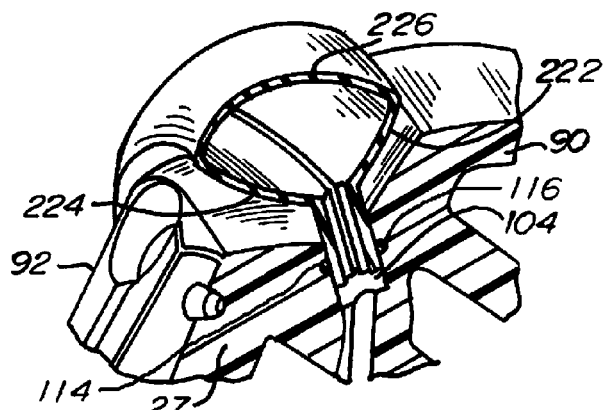
Fig.11A
Fig.11B
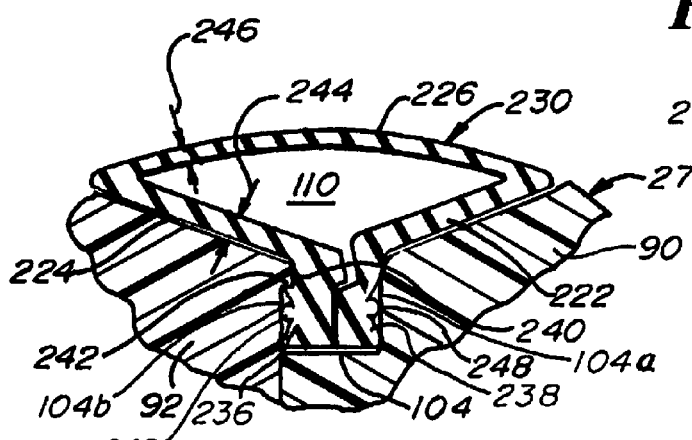
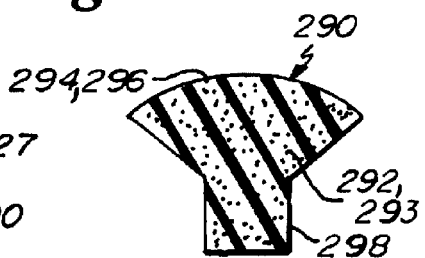
Fig.12A
Fig.13
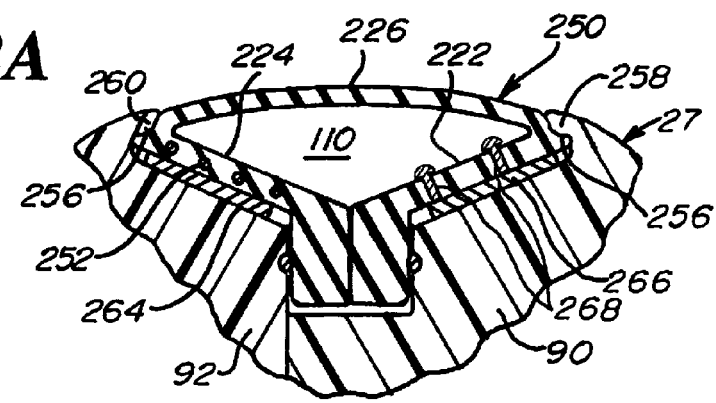
Fig.12B
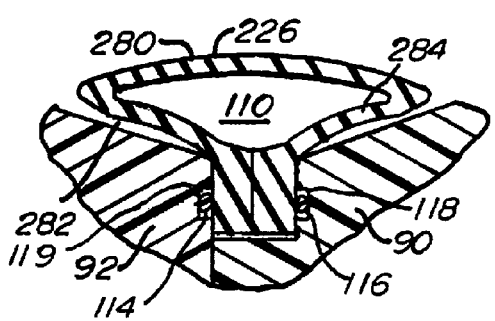
Fig.12C

RESPIRATOR TEST ACCESSORY

RELATED APPLICATIONS

This application claims the benefit of U.S. Patent Application No. 61/221,445, filed Jun. 29, 2009, and of U.S. Patent Application No. 61/221,448, filed Jun. 29, 2009, both of which are hereby incorporated by reference in their entirety.

FIELD OF THE INVENTION

The present invention is directed to test equipment. More particularly, the present invention relates to test equipment for protective gas masks and respirators.

BACKGROUND OF THE INVENTION

The testing of respirators and/or protective masks often utilizes a "head form" upon which the respirator or mask is mounted. Head forms often utilize a compliant mask registration member to interface with the respirator under test and to provide a positive seal against the seal cushion or interface seal of the respirator mask that seats against the user's face. The mask registration member can enable the use of a single head form to test respirators or masks of various sizes and having different interface sealing contours.

An inflatable "bladder" is commonly used as the mask registration member. The inflatable bladder conforms to the general shape of the interface seal to provide a seal between head form and mask. Accordingly, any leaks detected are generally known to originate with the mask components rather than with the mask fit.

U.S. Pat. No. 5,808,182 to Stumpf, the disclosure of which is hereby incorporated by reference herein in its entirety except for terms expressly defined therein, discloses a "covering" that covers a portion of a head form and is inflatable through a port on the head form. The covering of Stumpf comprises a wide, flexible band with transitions areas near the edges of the band that are sealed against the head form. Accordingly, the transition area must be constructed pressure tight to guarantee inflation of the covering. Stumpf does not disclose how these transition areas are to be made pressure tight.

U.S. Pat. No. 7,343,783 to Tilley, which is also hereby incorporated by reference herein in its entirety except for terms expressly defined therein, discloses an "inflatable seal" that is disposed in a recess on a single portion of a head form. Tilley offers no details on the construction of the inflatable seal, nor how the inflatable seal is secured within the recess. However, an embodiment of the Tilley disclosure is commercially available as part of the TDA-99B Respirator Function Tester, marketed by Air Techniques International of Owings Mills, Md., USA. The inflatable seals used in the TDA-99B comprise a seam that is sealed with an adhesive, and also an inlet tube that is inserted through an opening or slit in the inflatable seal and sealed using a patch and adhesive. The adhesives in the inflatable seal of the TDA-99B necessitates additional curing time in the manufacturing of the inflatable seal, and also additional quality assurance steps to check the integrity of the inflatable seal and the inlet tube.

Various components of a respirator test system require periodic calibration and maintenance to assure competent results. Such calibration and maintenance can require removal of the individual sensors, shipping of the test unit, or switching equipment and/or test fixtures to accommodate field calibration that adds to the bulk of the respirator test system.

U.S. Pat. No. 8,312,761, assigned to the assignee of the present application, discloses a head form having a bladder member that can be assembled to form an inflatable bladder without the use of adhesives and is suitable for replacement in the field. In one embodiment, the bladder member includes a pair of flanges that are disposed in a recess between a face portion and a base portion of the head form. The recess and flanges are dimensioned to cause an interference fit between the head form and the bladder member to compress the flanges together and secure the bladder member in place upon assembly. The compression causes the flanges to seal against each other for a leak tight fit. Also, sealing members, such as O-rings, can be disposed on the face and base portions, respectively, within the recess, to seal between the exterior of the flanges and the head form.

At higher inflation pressures, it has been observed that the inflatable bladder described in U.S. Pat. No. 8,312,761 can lift partially out of the recess in a phenomenon referred to herein as "lift away." Lift away can cause the flanges to slip beyond the seals in the recess and/or to deform with respect to each other and the inner surfaces of the recess, causing leaks in the head form assembly. Also, portions of the inflatable bladder that register against the head form can deform or curl away from the head form in a phenomenon herein referred to as "roll away." Roll away can cause the surface of the inflatable bladder against which the mask registers to take on a fundamentally different shape, which can cause leaks between the interface seal and the inflatable bladder.

At higher inflation pressures, it has been observed that the inflatable bladder described in the '049 Application can lift partially out of the recess in a phenomenon referred to herein as "lift away." Lift away can cause the flanges to slip beyond the seals in the recess and/or to deform with respect to each other and the inner surfaces of the recess, causing leaks in the head form assembly. Also, portions of the inflatable bladder that register against the head form can deform or curl away from the head form in a phenomenon herein referred to as "roll away." Roll away can cause the surface of the inflatable bladder against which the mask registers to take on a fundamentally different shape, which can cause leaks between the interface seal and the inflatable bladder.

Also, it has been observed that leaks will occasionally occur between the interface seal and the bladder even after inflation, and particularly when the bladder is new. The leaks cause a false positive that the mask components are leaking.

Organizations involved in the testing of respirators would welcome a respirator test accessory that complements already existing aerosol detection equipment and eases the burdens on equipment and personnel with respect to calibration and maintenance. Manufacturers of such test accessories would welcome an assembly process that reduces the dependence on adhesive seals and the time and quality assurance testing attendant thereto. Embodiments that address the problems of false positives of mask leakage, bladder lift away and/or bladder roll away would also be welcome.

SUMMARY OF THE INVENTION

Certain embodiments of the invention substantially eliminate the causes of the aforementioned false leak detection. One embodiment provides a mask registration member having a self-lubricating surface that contacts the interface seal of the mask under test, enabling the interface seal to slide relative to the mask registration member during the mounting process without compromising the seal therebetween. The sliding action can prevent deformations in the interface seal that cause false positives.

A problem with mask registration members, and in particular inflatable bladders, identified herein is an effect referred to as "creasing." When the mask is initially placed on the mask registration member, a surface tension can develop between member surface and the interface seal of the mask along a line of contact. As the mask becomes seated on the mask registration member, such as by expansion of the bladder outward upon inflation or contraction of the bladder inward upon deflation, or by pressing the mask against a non-inflatable mask registration member, the line of contact along which the mask is seated is expanded/contracted. The relative movement between the mask and the mask registration member can cause interface seal to be stretched or contracted slightly, especially if the surface of the mask registration member is sticky. Because the interface seal is substantially confined to the shape of the mask perimeter, the expansion/contraction of the interface seal can cause the interface seal to bunch up or pucker unevenly along its length, particularly at points where the surface tension between the interface seal and the registration member surface is reduced. The puckering can cause a crease to develop lateral to the line of contact, causing a leak path between the interface seal and the mask registration member. The creasing can cause the test system to detect leaks falsely attributed to leaks in the mask.

Various embodiments of the invention militate against lift away by positively capturing the flanges of a bladder member to arrest the outward radial expansion of the flange members during inflation.

A number of embodiments of the invention are presented herein that limit the degree of roll away of inflatable bladders. In some embodiments, portions of the inflatable bladder are stiffened and/or constrained from radial movement relative to the contacting portions of the bladder that contact the interface seal of the mask under test. Some embodiments of the inflatable bladder are pre-formed so as to deform into a desirable shape under inflation rather than in the deflated state.

Structurally, the mask registration member can be comprised of a base material, such as butyl rubber, that is mixed with a lubricious additive, such as paraffin wax. The combination reacts under certain conditions such that the additive diffuses to the surface in a so-called "blooming" process, providing a lightly self-lubricated surface that interfaces with the mask under test. The lightly lubricated surface allows the mask under test to gently slide into the leak test position without the attendant puckering which can cause creasing.

The blooming process can be controlled by physical conditions. With some mixtures, the additive is compatible with the base polymer only above a certain temperature, and lowering the temperature below this level causes the additive to come out of solution and diffuse to the surface. Thus, with certain base/additive mixtures, the mask registration member can be cooled to facilitate the self-lubricating characteristics for enhance performance of the leak testing apparatus.

The surface of the mask registration member can be lubricated in other ways, including the use of other dry lubricant additives to the base material, the use of oil-based additives to the base material, and/or the use of surface coatings. Etchings can also be applied in some circumstances to initially expose lubricious additives in lieu of a blooming process.

BRIEF DESCRIPTION OF THE DRAWINGS

FIG. 3 is a perspective view of the head form assembly in isolation in an embodiment of the invention;

FIG. 4 is an exploded view of the head form assembly of FIG. 3;

FIG. 7 is a rear elevation view of a respirator assembly, depicting connection of pneumatic lines for testing of a drink train in an embodiment of the invention;

FIG. 8 is a frontal elevation view of the respirator assembly of FIG. 7, depicting a connector for testing of an exhalation valve in an embodiment of the invention;

FIG. 10 is a control block diagram for a respirator test system in an embodiment of the invention;

FIG. 11A is a sectional view of the bladder in isolation in an embodiment of the invention;

FIG. 11B is a partial sectional view depicting the inflatable interior bladder and recesses;

FIG. 12A is a sectional view of an inflatable bladder, depicting interlocking flanges in an embodiment of the invention;

FIG. 12B is a sectional view of an inflatable bladder, depicting stiffeners in an embodiment of the invention;

FIG. 12C is a sectional view of an inflatable bladder in an embodiment of the invention; and FIG. 13 is a sectional view of a seating gasket for use with a head form in an embodiment of the invention.

DETAILED DESCRIPTION OF THE DRAWINGS

Figure 1:
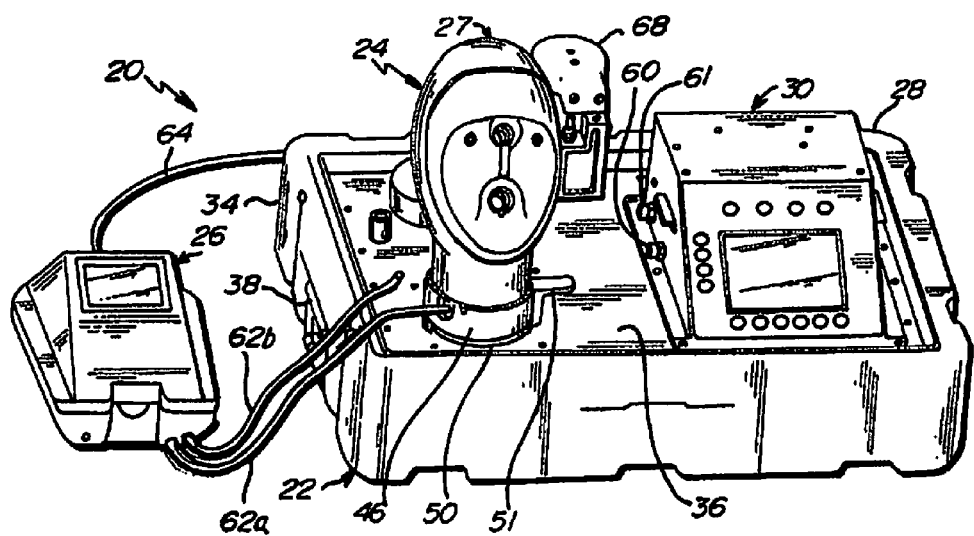
FIG. 1 is a perspective view of a head form test accessory in combination with a particle counter in an embodiment of the invention.
Figure 2:
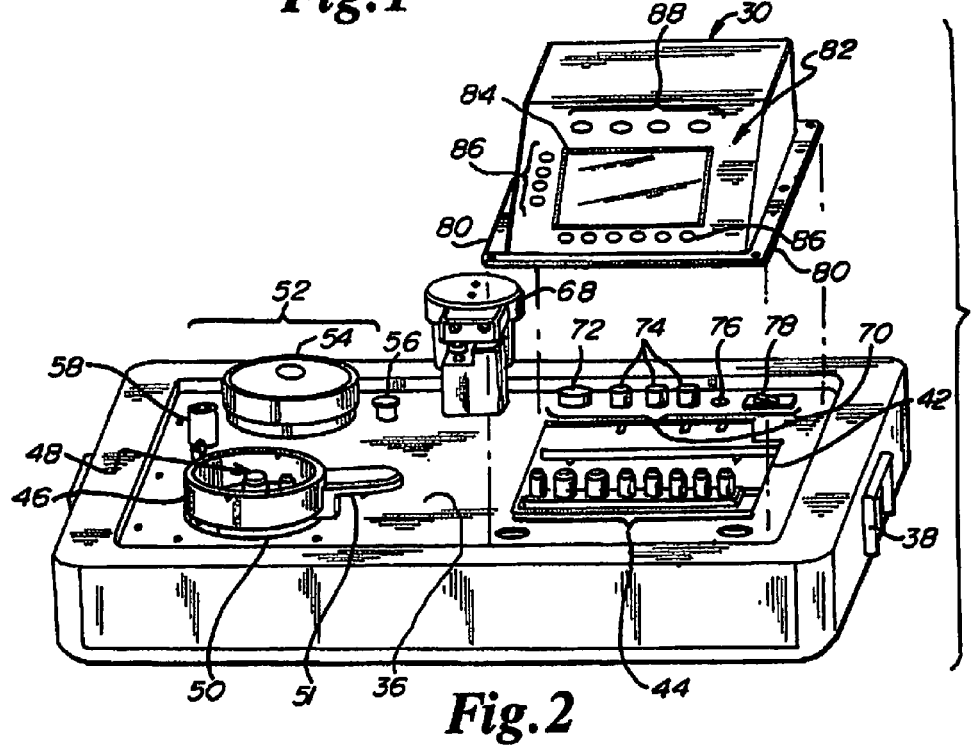
FIG. 2 is perspective view of the test accessory of FIG. 1 without the head form and depicting removal of the instrumentation module.

Referring to FIGS. 1 and 2, a respirator testing system 20 including a test accessory 22, a head form assembly 24 and a particle counter 26 is depicted in an embodiment of the invention. In one embodiment, the head form assembly includes a head form 27 having an outer contour that approximates the shape of a full human head. The accessory 22 includes a casement 28 and an instrumentation module 30. In the depicted embodiment, the casement 28 includes a chassis 34 that supports a console 36 with handles 38 operatively coupled thereto. The console 36 may define an opening that serves as a portal 42 between the instrumentation module 30 and various instrumentation interface connectors 44 in the interior of the casement 28.

The console 36 may include a mounting collar 46 for operative coupling to the head form assembly 24 and for guiding the head form assembly 24 for easy coupling of the head form assembly 24 to various head form instrumentation couplings 48 that extend into the casement 28. The mounting collar 46 may include a base 50 and an actuation lever 51. The head form instrumentation couplings 48 may be of a variety of forms, including pneumatic and/or electrical, and may be in communication with various components of the respirator testing system 20 such as the instrumentation module 30 and the particle counter 26.

The mounting collar 46 may include a magnetic coupling/decoupling feature. The base 50 may be configured to rotate about a central axis normal thereto with magnets (not depicted) disposed in the base 50. The magnets may be arranged to substantially align with magnets in the head form assembly 24 (e.g., numerical reference 134 of FIG. 6A). The magnets of the head form assembly 24 may be oriented so that they are attracted to the magnets disposed in the base 50 when the actuation lever 51 is in a locked position. Alternatively, or in addition, one or more magnets 134 may be disposed in the base 50 and oriented to repel the magnets 134 in the head form assembly 24 when the actuation lever 51 is in an unlocked position.

The casement 28 may further include a variety of air flow components 52 and controls that may be mounted to or otherwise accessible from the console 36, including an air intake filter 54, an air flow control valve 56 and a blower exhaust 58. The air flow components 52 may also comprise a drink train testing line 60 and/or an exhaust valve testing line 61, which in FIGS. 1 and 2 are operatively connected to the interface module 30, but may instead extend from the console 36 or other points on the casement 28.

An aerosol generator 68 may also be operatively coupled to the casement 28 or console 36, and may extend through the console 36 for accessibility. In one embodiment, a tent or cover (not depicted) is placed over the head form assembly 24. The interior of the tent can be in fluid communication with the output of the aerosol generator to create a high concentration aerosol environment about the head form assembly. When a tent is utilized, the free end of the sampling line 62b is located within the tent proximate the head form assembly 24. The aerosol generator 68 can also be operatively coupled to a sprayer (not depicted) for generation of a challenge aerosol for localization of leaks.

The particle counter 26 may be a stand alone unit, such as the PORTACOUNT PLUS, manufactured by TSI, Incorporated of Shoreview, Minn., USA, assignee to the instant application. In one embodiment, the particle counter 26 is connected to two aerosol sampling lines 62a and 62b and to an instrumentation cable 64. The aerosol sampling line 62a may terminate at the head form, and the aerosol sampling line 62b may terminate at the ambient atmosphere proximate the head form. The instrumentation cable may include power and/or instrument signal lines such as an RS-232 cable that connect to the casement 28.

A variety of electrical controls and components 70 may also be accessible from the console 36, such as an electrical source connector 72, various fuses 74, a power "on" indicator light 76 and an on/off switch 78.

In one embodiment, the instrumentation module 30 is configured for quick connection/disconnection from the pneumatic interface connectors 44. The pneumatic interface connectors 44 connect various pneumatic lines routed through the casement 28 to appropriate instrumentation and components in the instrumentation module 30. (See discussion below attendant FIG. 9 for additional details.) The pneumatic interface connectors 44 may be of a bulkhead type fitting that do not require manipulation of a locking mechanism on the connector itself. The pneumatic interface connectors 44 may be sealed by O-rings (not depicted) that are engaged between the pneumatic interface connectors 44 and the structures that define the corresponding mating ports (not depicted) within the instrumentation interface module 30.

The instrumentation module 30 may further include electrical connections (not depicted) such as ribbon cables or pig tails, with appropriate connectors in the casement 28 and/or the instrumentation module. Example connectors include Type 120A-A-111 screw terminal wire connector mating with a 120-M/121 board mounted connector, manufactured by WECO Electrical Connectors, Inc. of Quebec, Canada.

The instrumentation module 30 may include flanges 80 that register against and are secured to the console 36. The instrumentation module 30 may further include an operator interface 82 having a display screen 84 and various function actuators 86 and indicator lights 88.

In operation, the electrical cabling (not depicted) is operatively coupled between the instrumentation interface module 30 and the components within the casement 28. The instrumentation module 30 may be placed over the portal 42 so that mating ports (not depicted) within the instrumentation module 30 are aligned with pneumatic interface connectors 44. The pneumatic interface connectors 44 may include tapered distal end portions that serve to guide the pneumatic connectors into corresponding mating ports within the instrumentation module 30. Alternatively, or in addition, dowels (not depicted) may be provided on the console 36 adjacent the portal 42 that align with holes in the flanges 80 to aid in the alignment. The flanges 80 are brought into contact with the console 36 and secured in place by fasteners, such as conventional screws, wing nuts, spring loaded twist locks, or other quick release fasteners. By securing the instrumentation module 30 to the console 36, the various pneumatic interface connectors 44 may be secured in positive connection with the components within the instrumentation module 30. To detach the instrumentation module 30, the flange 80 is decoupled from the console 36 and the module 30 lifted away from the console 36 for disconnection of the module 30 with the pneumatic interface connectors 44.

The system may be arranged so that various instruments and components requiring periodic calibration and maintenance are contained in the instrumentation module 30. Accordingly, only the instrumentation module 30, and not the entire casement 28, is required for calibration and maintenance. Also, for scenarios where the instrumentation module is sent to a remote location for calibration and maintenance, the rest of the accessory 22 need not be removed from the field. In fact, a spare or "roving" replacement module may be utilized to keep the accessory 22 operational while the instrumentation module 30 is out of service.

Instructions that direct field personnel in the removal of the instrumentation module 30 and the installation of a replacement module, such as outlined above, could be provided on a tangible medium that accompanies the unit. The "tangible medium" may comprise a computer readable medium, such as a CD, flash memory or a hard disk. In another embodiment, the tangible medium could reside on a remote computer accessible over the interne. In one embodiment, the tangible medium comprises an instruction sheet that accompanies the respirator testing system 20 or stickers that are posted on the respirator testing system 20.

Referring to FIGS. 3 and 4, the head form assembly 24 used in the respirator testing system 20 is depicted in an embodiment of the invention. The head form assembly 24, which can be shaped generally in the form of a human head, can comprise a base portion 90, a face portion 92 and a mask registration member 91, all held together by fasteners 96. The mask registration member 91 can be radially continuous about a central axis 95 and configured to present a wide registration surface 97. The base portion 90 may include a neck portion 98 that extends to a base ring 100. In one embodiment, a sampling port 102 is located in the base ring for interfacing with the sampling line 62a of the particle counter 26.

Functionally, providing the head form assembly 24 in combination with the mask registration member 91 enables the testing of respirator masks of various types and sizes. The masks may be strapped to the head form assembly 24 in the same manner as they would be to a human head, without need for accessories to accomplish the coupling. The sealing interface of the mask under test is seated against the registration surface 97 of the mask registration member 91. The width of the registration surface 97 may be sized large enough to accommodate respirator masks of different sized sealing interface openings. Also, the neck portion 98 of the head form assembly 24 enables testing of respirators that seal around the neck of the user—again without need for special accessories—something a partial head form or a face form might not enable.

The material of the mask registration member 91 can include a base material that is mixed with an additive. The mixing process can, in some instances, be sufficiently exothermic to melt the additive and disperse it through the base material. Heat can also be added to the process to promote additive dispersion. Once the base material and additive have been adequately combined, the rubber compound can be vulcanized and formed into the mask registration member 91 by casting, injection molding or other appropriate processes.

In one embodiment, the base material of the mask registration member 91 includes a rubber compound, such as natural rubber, butadiene rubber, styrene-butadiene rubber, isoprene rubber and silicone rubber, that is mixed prior to vulcanization with a dry wax additive. Certain additives, such as paraffin wax or naphthenes, are known to diffuse to the surfaces of certain base materials over a period of time in a process commonly referred to as "blooming." The diffused material leaves a residue on the surface which we have found provides a lightly lubricated surface. Accordingly, a mask registration member 91 that incorporates such base materials and additives can provide lubricity to the registration surface 97 that can act to prevent creasing.

The blooming process is accelerated at cooler temperatures (e.g., below 10° C.). Accordingly, to facilitate the blooming process, the mask registration member 91 can be cooled to temperatures below 10° C. for approximately twenty-four hours (before or after assembly with the head form 27) to provide a lubricious surface. The mask registration member 91 can then be used for leak testing with an improved, lightly lubricated registration surface 97 that mitigates the chance of creasing.

Example base materials include, but are not limited to, butyl rubber, buna rubber, and thermoplastic elastomers such as SANTOPRENE. Example additives include paraffin wax, naphthene, polyethylene wax, microcrystalline waxes and normal chain hydrocarbons having from 26 to 29 carbon atoms. Blooming compositions that utilize these and other additives are disclosed in U.S. Pat. No. 3,856,731 to Shinomura and U.S. Pat. No. 6,639,003 to Borsinger et al., the disclosures of which are hereby incorporated by reference herein in their entirety, except for express definitions contained therein.

In one embodiment, the paraffin wax may be greater than 0.5% of the total compound volume. In another embodiment, the paraffin wax may be less than 3% of total compound volume. Other embodiments implementing rubber and paraffin wax compositions for maintaining blooming over a wide range of temperatures are disclosed in U.S. Pat. No. 5,296,129 to Ikeda et al., which is hereby incorporated by reference herein in its entirety, except for express definitions contained therein.

The mask registration member 91 can also be etched in an attempt to initialize surface lubricity instead of relying on a blooming process. Certain base materials (e.g., silicone) to which the lubricious additive material is added flows much more rapidly into the molding than does the additive, resulting in the base material reaching the extremities of the molding before the additive. If the base material sets up before the additive is uniformly diffused throughout the molding, a paucity of additive material on the surfaces of the bladder member 93 can result. It is believed that by etching the registration surface 97 of the mask registration member 91, the lubricious additive material that is beneath the surface can be exposed, providing the desired lubricity.

PTFE can be blended as an additive into the rubber compound prior to vulcanization to provide improved durability and surface lubricity, with compositions having PTFE amounts that range from 15 to 80 percent by weight and an amount of molybdenum disulfide incorporated into an elastomer. See U.S. Pat. No. 4,596,839 to Peters, the disclosure of which is hereby incorporated by reference in its entirety herein except for express definitions contained therein.

In another embodiment of the invention, an oil based additive, such as silicone oil, ethyl silicone oil, vinyl silicone oil, stearates and mixtures thereof, can be added to the rubber compound to provide self lubricating qualities in the mask registration member 91. The oil based additive is added to the rubber compound prior to mixing to distribute the oil throughout the rubber compound. A vulcanizing agent can then be added before the rubber compound is formed into the mask registration member 91. The oil based additive diffuses to the surface of the mask registration member 91 to lubricate the surface of the mask registration member 91 and prolong the life of the rubber compound. See U.S. Pat. No. 7,498,378 to Yeung, the disclosure of which is hereby incorporated by reference in its entirety herein, except for express definitions contained therein.

Some embodiments utilize a polytetrafluoroethylene (PTFE) coating applied to the rubber compound to improve the durability of the resulting mask registration member 91. The PTFE coating can be formed on a pre-shaped a rubber surface by applying a PTFE resin dispersion to the surface. The PTFE coating is then cured by briefly heating the pre-shaped rubber surface with the PTFE coating to high temperatures. See U.S. Pat. No. 4,789,565 to Kon et al. Other dry film lubricant coating compositions and techniques are disclosed at U.S. Pat. No. 4,808,323 to Fisher et al. The Kon and Fisher references are hereby incorporated by reference herein in their entirety except for express definitions contained therein.

Figure 5:
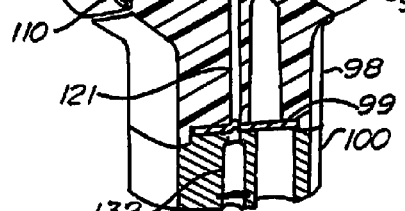
FIG. 5 is a sectional view of a head form assembly in an embodiment of the invention.
Figure 5A:
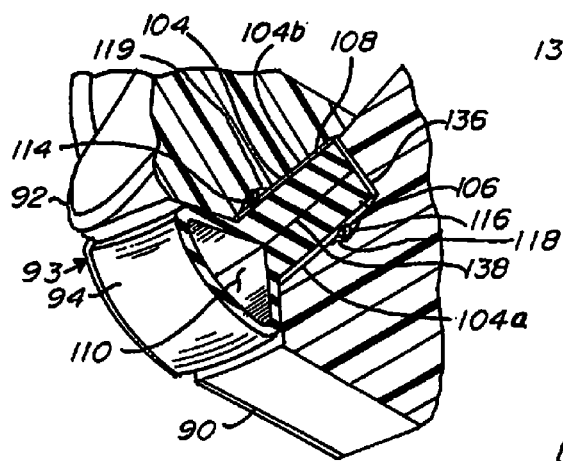
FIG. 5A is an enlarged partial sectional view depicting a bladder member forming an inflatable bladder on the head form assembly of FIG. 5.
Figure 5B:
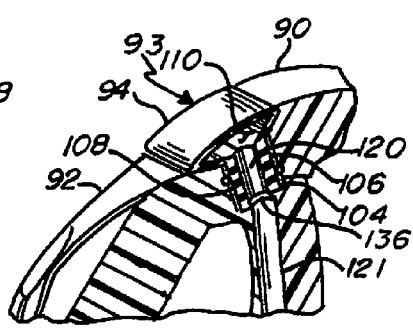
FIG. 5B is an enlarged partial sectional view depicting an inlet to the interior chamber of the bladder of the head form assembly of FIG. 5.

Referring to FIGS. 5, 5A and 5B, the head form 27 having a bladder member 93 as the mask registration member 91 is depicted in an embodiment of the invention. The bladder member 93 includes an inflatable portion 94 and flange portions 106 and 108. In one embodiment, the bladder member 93 comprises a cast soft urethane or an injection molded silicon. For configurations utilizing the bladder member 93, the bladder member 93 may then be inflated to provide a seal of high integrity between the head form assembly 24 and the mask.

The base and face portions 90 and 92 may cooperate to define a continuous interface therebetween. In one embodiment, the continuous interface defines a continuous recess 104 having sides 104a and 104b defined by the base and face portions 90 and 92, respectively. Side 104b corresponds to an exterior surface proximate the perimeter of the face portion 92. The flange portions 106 and 108 that extend from the inflatable portion 94 can be captured in the recess 104 upon assembly of the base and face portions 90 and 92 to compress the flange portions 106, 108 together, forming an air tight seal and defining an inflatable interior chamber 110. The base and face portions 90 and 92 may include continuous grooves 118 and 119 formed in the sides 104*a* and 104*b*, respectively, that interface the flange portions 106 and 108, respectively (FIG. 5A). O-rings 114 and 116 may be disposed in the grooves 118 and 119, respectively to provide an added measure of sealing integrity between the interior of the head form assembly 24 and the ambient environment.

In an alternative arrangement (not depicted), the o-ring/groove arrangement may be reversed so that one or both of the grooves are formed on the flange portions 106, 108 for seating of the o-rings 114, 116. In yet another alternative arrangement, the flange portions 106, 108 may be formed with detents (not depicted) that cooperate with grooves 118 and/or 119 formed in the base portion 90 and face portion 92, respectively, to not only provide sealing integrity of the inflatable portion 94, but also to secure the bladder member 93 within the recess 104.

The flange portions 106 and 108 may also cooperate to form an inlet 120 therebetween (FIG. 5B). The inlet 120 may be in fluid communication with an inflation source passage 121 formed, for example, in the base portion 90. Alternatively, one or both of the flange portions 106, 108 may have one or more passages extending through the flange portion 106 or 108 and in fluid communication with the inflatable interior chamber 110 and located proximate the inflation source passage 121 (not depicted). In one embodiment, the inflation source passage 121 extends from proximate the inlet 120 to the base ring 100. The base ring 100 may include a coupling 132 for connection of the inflation source passage 121 to a pressure source and magnets 134 that magnetically couple the magnets in the mounting collar 46. In one embodiment, the inflation source passage 121 is not directly coupled to the inlet 120; rather, fluid communication between the inflation source passage 121 and the inlet 120 is augmented by a gap or plenum 136 between the flange portions 106, 108 and the base portion 90. The fasteners 96 may implement features that that provide leak tight coupling, such as grommets or o-rings at the shoulders of the fasteners, pylable fastener material, threads doped with sealant or sealing tape, or a combination thereof.

Functionally, the air tight assembly of the head form assembly 24 avoids a requirement that the plenum 136 be air tight. In this embodiment, gas that is pressurized within the plenum 136 may leak between the interface of the base portion 90 and the face portion 92, but does not depressurize the plenum 136 or, subsequently, the inflatable portion 94, because the interior of the head form assembly 24 may be maintained substantially at the inflation pressure of the inflatable portion 94.

Alternatively, or in addition, a sealing gasket 122 (FIG. 4) or other appropriate seal may be disposed between the interface of the base and face portions 90 and 92, effectively making the plenum 136 air tight. The sealing gasket 122 can also be adapted to seal various passageways (e.g. inlet and outlet passageways 124, 125) that pass between the face and base portions 90 and 92. To enhance the seal of the passageways that transition between the base and face portions 90 and 92, a continuous raised face 123 can be formed in the face portion 92 (as depicted) and/or in the base portion (not depicted) that seats against the sealing gasket 122 and locally compresses the sealing gasket 122 against the continuous raised face 123 for an enhanced seal.

The base and face portions 90 and 92 of the head form 27 may be formed of a resin, such as epoxy, urethane or a high density plastic, and may be formed by process of pour or injection molding. The base ring 100 may be constructed of a metal, such as aluminum or stainless steel, for precision forming of coupling interfaces therein. Anchors (not depicted) may extend into the head form 27 to provide a way of fastening the base ring 100 to the neck portion 98. Alternatively, fastener anchors (not depicted) may be disposed in the neck portion for use of fasteners to couple the base ring 100 to the neck portion 98.

A gasket 99 can also be disposed between the base ring 100 and the neck portion 98 to prevent leakage radially outward at the interface of the base ring 100 and neck portion 98. In one embodiment, depicted in FIG. 4, the neck portion 98 of the head form 27 includes continuous raised faces 101 that surround the various passages (e.g., inlet, outlet and inflation source passages) that pass through the neck portion 98 and base ring 100. Alternatively, or in addition, continuous raised faces can be formed to surround the various passages on the upper face of the base ring 100.

In assembly, the base ring 100 can be attached to the neck portion with bolts 103 and with the gasket 99 disposed therebetween. The continuous raised faces 101 act to locally compress the gasket 99 about the passageways to enhance the seal for the transition of the passageways. The bladder member 93 can be positioned on the base portion 90 with the inlet 120 substantially aligned with the passage 121. The face portion 92 may then placed over the base portion 90 and bladder member 93 sub-assembly and secured to the base portion with the fasteners 96. The base portion 90, face portion 92 and flanges 106, 108 may be dimensioned such that the act of fastening the face portion 92 to the base portion 90 causes a compression of the flange portions 106 and 108 together to form a seal 138 therebetween, as well as between the flanges 106, 108 and the base and face portions 90 and 92, respectively. In one embodiment, the seal 138 is formed without use of adhesives or binders; that is, the flanges 106, 108 provide a "dry seal" between each other and with the base and face portions 90 and 92. In other embodiments, an adhesive may be disposed between flanges 106 and 108, and/or between the flanges 106, 108 and the recess 104.

An advantage of the above disclosed methods of assembly is that cure time for an adhesive does not delay or extend manufacturing or assembly time. When dry seals are implemented, there is no cure time because there is no adhesive. The inflatable portion 94 may be formed during assembly of the head form assembly 24 and without need for a separate sealing operation before installation on the head form assembly 24. When adhesives are implemented in the present invention, the adhesives are not always relied upon for structural purposes; that is, the head form 27 can, in some applications, provide structure that holds the components in place while the adhesive(s) cures, so that the head form assembly 24 may proceed through any remaining steps of manufacturing or packaging without delay.

Another advantage of various embodiments disclosed is that there is no need to undergo separate manufacturing steps to enable access of pressurized gas into the inflatable portion 94. In one embodiment, rough alignment between the inlet 120 and the passage 121 enables charging of the inflatable interior chamber 110, without need for insertion of tubing into the inflatable portion 94 or bladder member 93 and without the use of adhesives to provide a seal between the tubing and the bladder member 93. In certain embodiments, the plenum 136 can also be sized so that pressurized gas entering the passage 121 will find its way into the inflatable interior chamber 110 without need for any alignment of the inlet 120 with the passage 121.

Figure 6A:
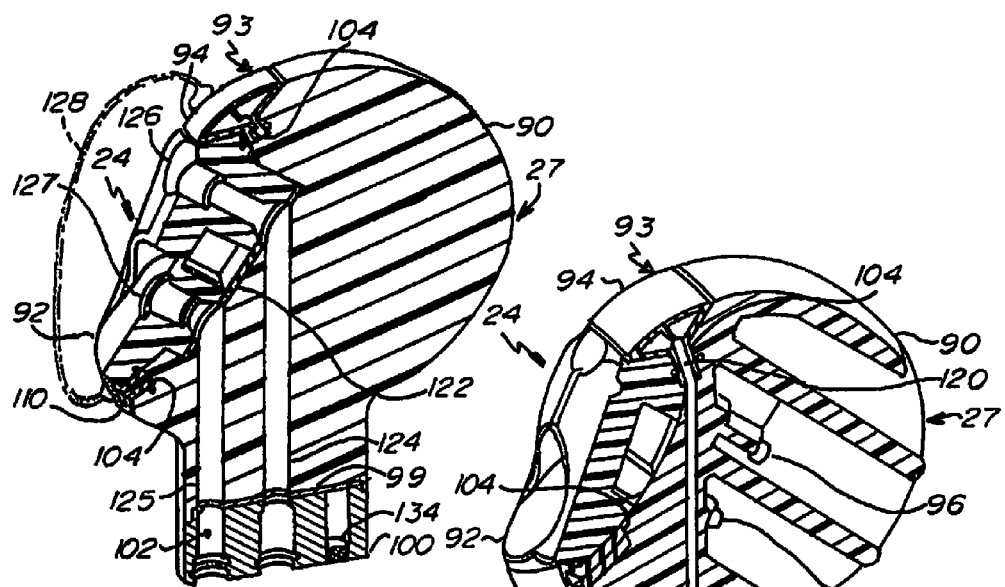
FIG. 6A is a sectional view of a head form assembly in an embodiment of the invention.

Referring to FIG. 6A, a sectional view of the head form assembly 24 is depicted in an embodiment of the invention. An inlet passage 124 and an outlet passage 125 each pass through the face and base portions 92 and 90, terminating at inlet and outlet ports 126 and 127, respectively. A mask or respirator 128, depicted in phantom in FIG. 6A, is mounted to the head form assembly 24 and in contact with the inflatable portion 94 to form a closed circuit between the inlet and outlet passages 124 and 125.

Representative and non-limiting examples of the flow rate and the vacuum caused thereby is approximately 16 liters per minute (lpm) and −6 inches of water column (in. wc). In one embodiment, the flow rate is set or controlled to within ±½ lpm of the 16 lpm flow rate, and the vacuum to within ±½ in. wc of the −6 in. wc vacuum. In another embodiment, a representative and non-limiting flow rate is 14 lpm or higher, and a vacuum of −5 in. wc or greater. Matching the desired flow rate and vacuum is discussed further in connection with FIG. 9.

In operation, a flow of air can be initiated through the inlet passage 124 which passes through the mask 128 and out the outlet passage 125. The velocity of the air flow can cause a drop in the static pressure of the closed circuit, thus creating a vacuum relative to the ambient atmosphere. If there are leaks in the mask 128, airborne particles that are proximate the leak are drawn into the mask and exit the head form assembly 24 via the outlet passage 125. In one embodiment, the particle counter 26 draws samples from the outlet passage 125 via sampling line 62a, which is plumbed to the sampling port 102 to measure the concentration of particles passing through the outlet passage 125. A sample is also drawn via sampling line 62b to determine the concentration of ambient particles external to but proximate the head form assembly 24. In this embodiment, the ratio of the ambient concentration to the concentration of particles in the outlet passage 125 is the fit factor.

Figure 6B:
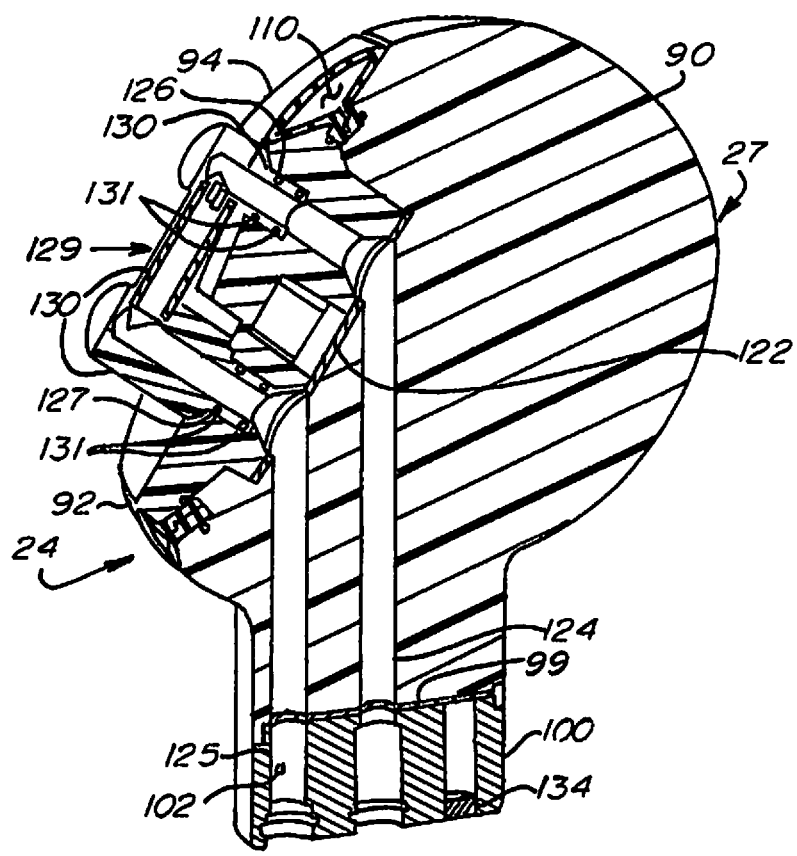
FIG. 6B is a depiction of the head form assembly of FIG. 6A with an adaptor fitting for testing the integrity of the head form assembly.

Referring to FIG. 6B, the head form assembly 24 is depicted with an adaptor 129 for testing the integrity of the respirator testing system 20 in an embodiment of the invention. In this embodiment, the adaptor 129 comprises tubing sections 130 that cooperate with the inlet and outlet ports 126 and 127 to form a closed circuit between the inlet and outlet passages 124 and 125. Seals 131, such as O-rings, may be located near the ends of the adaptor to provide an air-tight coupling between the adaptor 129 and the inlet and outlet ports 126, 127.

Other configurations can be adapted to serve the function of the adaptor 129. For example, instead of the inlet and outlet ports 126 and 127 being female, they could be configured as a male structure, i.e. as a port fitted with a stub that accommodates a compression fitting, or as a hose barb that accommodates a flexible tubing. Other structures for accomplishing a closed circuit between the inlet and outlet passages 124, 125 are apparent to the artisan.

Functionally, the closed circuit created by the adaptor 129 enables the testing of the integrity of the head form assembly 24. The low static pressure that causes a vacuum in the mask 128 of FIG. 6A is generally present throughout the closed circuit. Accordingly, any leaks between the closed circuit (head form assembly 24 and various lines and fixtures that convey the air flow thereto) will tend to draw ambient particles into the circuit, which can result in an erroneously low fit factor indication. The adaptor 129 generally isolates the circuit to detect such leaks.

In one embodiment, the head form assembly 24 may be equipped with a plurality of clip assemblies 140, each comprising a fastening mechanism 142 and a clip 144 (FIG. 3). Optionally, an adjustable extension 146, such as a strap, is provided between the fastening mechanism 142 and the clip 144. The fastening mechanism 142 may comprise a snap 148 having a socket portion 148.2 that cooperates with a stud portion 148.4 mounted on the head form assembly 24 to secure the clip assembly 140 to the head form assembly 24. Alternatively, the clip assemblies 140 may be attached to the head form assembly 24 using a standard fastener that couples with a threaded member that is moored in the head form 27 of the head form assembly 24. In another embodiment, slots may be configured to mate with the fastening mechanism 142 to secure the clip assembly 140.

(Note: FIG. 3 depicts only one clip assembly 140 mounted thereto, with stud portions 148.4 depicted for two other clip assemblies 140.)

Functionally, the clip assemblies 140 can be attached to the head form assembly 24 when it is desired to test a mask that is not fitted with a harness. The adjustable extensions 146 can be set to a desired length that applies a radial tension on the mask to secures the mask firmly against the inflatable portion 94. The clip assemblies 140 may be detached from the head form assembly 24 when not in use.

Referring to FIGS. 7 and 8, appurtenances and methods related to the drink train and exhaust valve testing lines 60 and 61 are described and depicted in an embodiment of the invention. A respirator mask 150 is depicted having an interface seal 151, attachment straps 152, an exhaust outlet valve 153, voicemitters 154 and a filter port 155. The respirator mask 150 in the depictions also includes a drink train 156 including a quick disconnect fitting 157 on a proximate end and a mouth piece 158 on a distal end.

In FIG. 7, the drink train testing line 60 is depicted as having a fitting 160 operatively coupled to the distal end. The fitting 160 may be sized to provide an air tight seal when it is coupled with the mouth piece 158. A variety of fittings may serve the purpose of the fitting 160, because mouth pieces for drink trains tend to be flexible and may conform to the contour of the fitting 160. For example, a LUER adaptor of appropriate size may be used. A drink canister adaptor 162 may also be provided that engages with the quick disconnect fitting 157.

In operation, the fitting 160 is inserted into and seated within the mouth piece 158 to provide a temporary seal. To test the drink train 156 for leaks, the drink train testing line 60 can be pressurized or drawn to a vacuum with the quick disconnect fitting 157 in a closed position, and the pressure monitored to detect whether there is a decay in the pressure or vacuum. To test the drink train 156 for obstructions, the drink canister adaptor 162 is coupled to the quick disconnect fitting 157 to open the quick disconnect fitting 157. Pressure decays and flow rates for these respective tests may be measured with instrumentation within the casement 28 that are operatively coupled to the drink train testing line 60.

An advantage provided by this configuration is that the accessory 22 does not have to be altered to accommodate different mask types. Various drink canister adaptors 162 are readily available as the replacement parts for the drink canisters and are implemented independent of the accessory 22.

In FIG. 8, an outlet valve adaptor 164 is depicted as being attached to a distal end of the exhaust valve testing line 61 in an embodiment of the invention. In the depicted embodiment, the outlet valve adaptor 164 includes a central tube 166, plunger portion 168 and a biasing spring 170 operatively coupled with an H-bracket 172. The H-bracket 172 may be formed of a resilient material, such as a high density plastic and include detents 174 at the distal end. A seal member (not depicted) such as an O-ring or gasket, may be disposed on the distal face of the plunger portion 168.

In operation, the plunger portion 168 is pressed against the outer surface of the exhaust outlet valve 153 and the H-bracket 172 advanced until the detents 174 engage with an outer perimeter 176 of the exhaust outlet valve 153. The biasing spring 170 is thereby compressed between the plunger portion 168 and the H-bracket 172 to provide an active force that keeps the seal member in sealing engagement with the exhaust outlet valve 153. The resiliency of the H-bracket 172 may enable an operator to flex the legs of the H-bracket 172 outward to pass over the outer perimeter 176 of the exhaust valve and to exert a clamping force on the outer perimeter 176 to hold the plunger portion 168 over the exhaust valve outlet 153. By this arrangement, the outlet valve adaptor 164 can accommodate a range exhaust outlet valves sizes. Also, outlet valve adaptors having plunger portions and H-brackets of various sizes and dimensions may be provided to accommodate a wide range of exhaust outlet valves. These outlet valve adaptors may be readily coupled/decoupled from the exhaust valve testing line 61 without need for altering the accessory 22.

Figure 9:
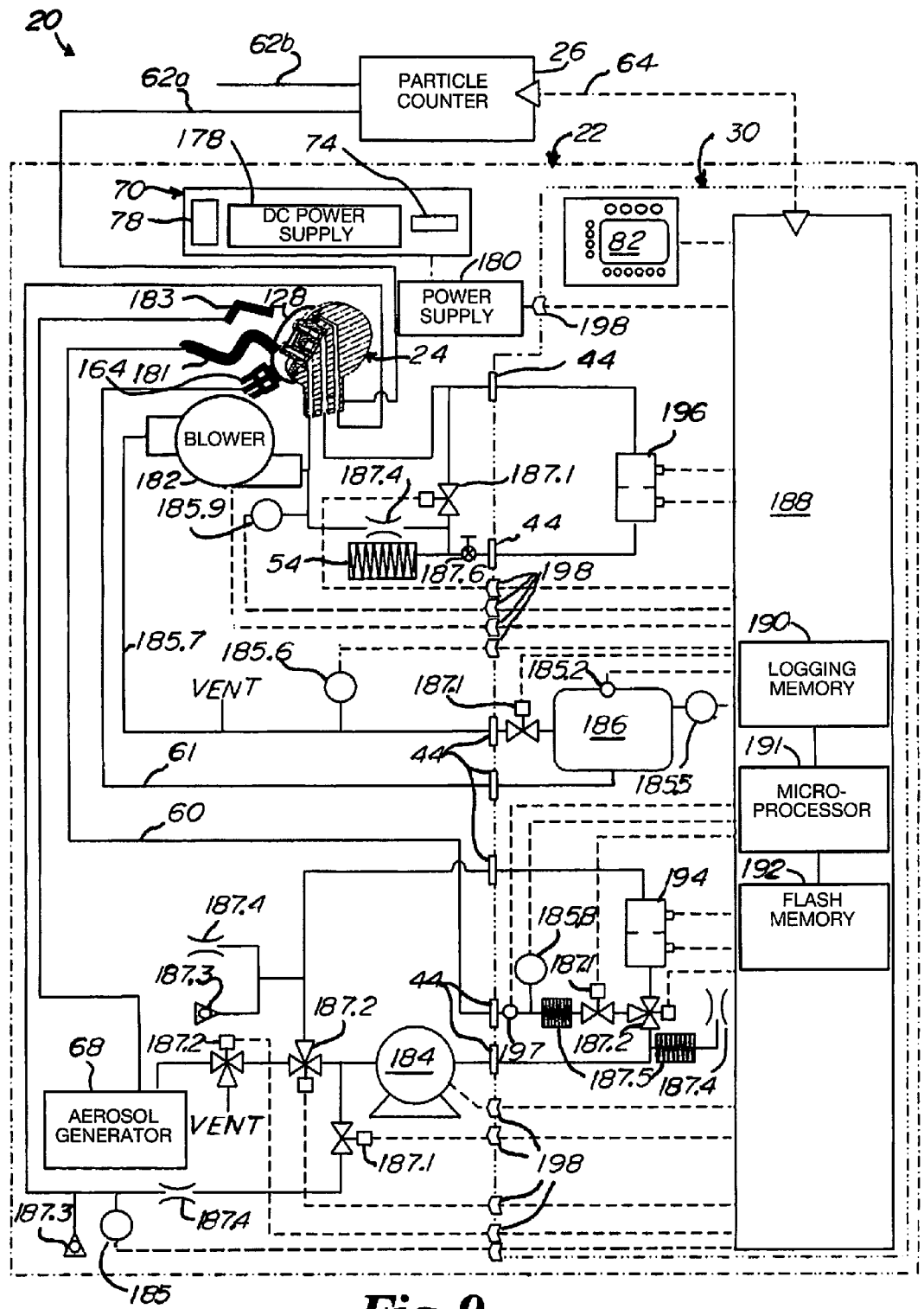
FIG. 9 is a schematic of a head form test accessory in combination with a particle counter in an embodiment of the invention.

Referring to FIG. 9, a schematic of the respirator testing system 20 is depicted in an embodiment of the invention. The schematic depicts the various components of an embodiment of the invention, with the accessory 22 and the instrumentation module 30 bounded by phantom lines. Electrical lines (power, signal and computer) are depicted with dashed lines, while pneumatic lines are depicted with solid lines.

A low voltage, DC power supply 178 and a main power supply 180 may supply power to the various components of the respirator testing system 20. In one embodiment, a blower 182 is used for driving air through the inlet and outlet passages 124, 125 for drawing a vacuum within the breathing chamber of the mask 128 to test the mask integrity. In one embodiment, a diaphragm pump 184 can be utilized for operation of the aerosol generator 68, testing of a drink tube and/or drink train 181, and for inflating the inflatable portion 94. The aerosol generator 68 may be operatively coupled to a sprayer 183 to assist the operator in localizing leaks in the mask or the between the inflatable portion 94 and the interface seal.

A pressure sensor 185 may be utilized to measure the inflation pressure for the bladder member 93. Example and non-limiting inflation pressures for the bladder member can be greater than 3 psi. In one embodiment, the inflation pressure is nominally 6 psi. In another embodiment, the inflation pressure is less than 8 psi.

A testing volume 186 instrumented with a temperature sensor 185.2 and a pressure sensor 185.5 may be provided to augment a pressure decay measurement of the leak rate of mask exhalation valves. In one embodiment, a pressure sensor 185.6 is tapped into a blower line 185.7 that runs between the blower 182 and the testing volume 186 and may be used to measure barometric pressure when the blower is not operating.

A pressure sensor 185.8 may be tapped into the drink train testing line 60 for measuring the operating pressure during testing of the drink train. The pressure sensor 185.8 can be used to determine a pressure decay rate for leak detection in the drink train 181, and can also be used to establish the pressure drop through the drink train 181 when a constant flow rate is established through the drink train 181.

Another pressure sensor 185.9 may be used to determine the vacuum level in the outlet passage 125, which effectively measures the vacuum in the mask 128.

Control of the fluid flow may be provided various and sundry solenoid-operated isolation valves 187.1 and 3-way valves 187.2, check valves 187.3, restriction orifices 187.4, filters 187.5 and a needle valve 187.6. In one embodiment, the needle valve is used to set the vacuum level as measured by pressure sensor 185.5 while the instrumentation module 30 controls the flow rate through the mask as measured at a desired level.

The schematic of FIG. 9 also depicts example components that may be contained in the instrumentation module 30 as bounded by the dashed line. In one embodiment, a computer board 188 includes a microprocessor 191 operatively coupled with memory devices that include a logging memory 190 and a flash memory 192. In the embodiment depicted in FIG. 9, the instrumentation module 30 further includes a first orifice flow meter 194 for measuring the flow rate through the diaphragm pump 184 for the drink tube and drink train tests and a second orifice flow meter 196 for measuring the flow rate for the mask test, and various temperature sensors (e.g., 185, 197) and valving (e.g., 187.1, 187.2) for execution of the various tests. The low voltage power supply 178 can be divided down to provide prescribed voltage levels (e.g. 3.3V, 5V, 12V, both fixed and variable) to various components.

The instrumentation module 30 is depicted in the schematic of FIG. 9 as interfacing with the appurtenances outside the instrumentation module 30 via pneumatic connectors (e.g., pneumatic interface connectors 44) and electrical connectors 198. The electrical connectors 198 may be provided by a ribbon cable and connector that extends out of the portal 42 when the instrumentation module 30 is removed for ready connection/disconnection. Other electrical connecting arrangements, such as sliding or surface contacts, can be implemented that establish connection upon placement of the instrumentation module over the portal 42.

Referring to FIG. 10, a general block diagram of the respirator testing system 20 is depicted in an embodiment of the invention. The test accessory 22 is depicted as having a central processor unit (CPU) 210 that accesses the logging memory 190. The CPU 210 may also communicate with a remote computer 212 and a bar code scanner 214, as well as an aerosol detector 216 (e.g. the particle counter 26).

Functionally, the bar code scanner 214 enables scanning of the serial numbers of newer respirators as well as other bar coded information. The CPU can store the information about the mask and the test parameters locally in the logging memory 190, and/or transfer the information to the remote computer 212 for documentation or further analysis.

Referring to FIGS. 11A and 11B, the operation of the bladder member 93 at higher inflation pressures is depicted in an embodiment of the invention. In one embodiment, the cross-section of the inflatable interior chamber 110 bounded by the inflatable portion 94 defines a shape similar to an arc segment. More specifically, in a deflated state, the inflatable interior chamber 110 of FIG. 11A is bounded on two sides by straight members 222 and 224 and on a third side by an arcuate member 226.

At higher inflation pressures, the deformation of the inflatable portion 94 can cause the members 222, 224, and 226 to deform. While deformation of the arcuate member 226 is generally desirable to affect a seal against a mask, deformation of the straight members 222 and 224 can cause them to curl away from the head form 27 as depicted in FIG. 11B in a phenomenon herein referred to as "roll away." Roll away can cause the registration surface 97 to have a normal vector that is substantially different from the deflated position, such that masks do not register properly on the registration surface 97.

High inflation pressures can also cause the bladder member 93 to expand in the radial direction such that the flanges 106, 108 of the bladder member 93 lift away from the recess 104, also depicted in FIG. 11B. The lifting away of the bladder member 93 from the recess 104 can cause the bladder member 93 to dislodge from the recess 104 in places, and more generally can cause the inflatable interior chamber 110 to leak between the flanges 106 and 108 of the bladder member 93.

Referring to FIG. 12A, a sectional view of an alternative bladder member 230 is depicted in embodiments of the invention. The bladder member 230 includes first and second interlocking flange members 236 and 238. The first interlocking flange member 236 also includes a notch 240 that cooperates with a detent 242 on the face portion 92. The detent 242 prevents the first interlocking flange member 236 from lifting out of the recess 104, which in turn prevents the second interlocking flange member 238 from lifting out of the recess 104. In this way, the interlocking flange members 236 and 238 prevent the bladder member 230 from growing away from the recess 104 during inflation. To mitigate the degree of roll away, the straight members 222 and 224 may be thicker than the arcuate member 226. Typically, a thickness 244 of the straight members is 1.5 times or more a thickness 246 of the arcuate member 226.

The FIG. 12A depiction also presents a pair of ridge portions 248 and 249, one each formed on the faces of the flanges 108 and 106, respectively. The ridge portions 248 and 249 can be integrally formed with the interlocking flange members 238 and 236, respectively, forming a proud, continuous ridgeline on the outward faces of the interlocking flange members 238 and 236 that interface with the sides 104a and 104b of the recess 104. In this embodiment, the sides 104a and 104b can be flat (i.e. without grooves 118, 119) so that when the bladder member 230 is disposed between the sides 104a and 104b, the interlocking flange members 238 and 236 are compressed together, as depicted in FIG. 12A. The compression of the flange members 238 and 236 can enhance the seal therebetween, as well as providing an enhanced seal where the ridge portions 248 and 249 register against the sides 104a and 104b of recess 104.

Functionally, the ridge portions 248 and 249 negates the need for the O-rings 114 and 116 and attendant grooves 118, 119. This configuration can reduce the complexity of assembly by eliminating the need for the O-rings 114 and 116, which can elongate due to stretching over time and become difficult to contain within the grooves 118, 119.

Referring to FIG. 12B, a bladder member 250 including other structural aspects that mitigate the effects of roll away is depicted in an embodiment of the invention. The bladder member 250 may be formed with cords 252 that wind through the straight members 222 and 224. Alternatively, the cords 252 can be bonded to a surface of the straight members 222 and 224 (not depicted) instead of being cast inside the members. In one embodiment, the bladder member 250 includes notched edges 256 that cooperate with detents 258 and 260 on the base and face portions 90 and 92, respectively, of the head form 27 to capture the bladder member 250. In one embodiment, a stiffener or stiffeners 264 can be adhered thereto to the straight member 264 with an adhesive bond. The stiffener 264 can be continuous, conforming to the outer face of the straight member 224.

Referring again to FIG. 12B, a stiffener 266 having protrusions 268 for overmolding of the straight member 222 thereto is depicted in an embodiment of the invention. The overmolding process provides a high integrity overmolded bond between the straight section 222 and the stiffener 266.

The cords 252 and/or stiffeners 264, 266 may be made of a flexible material, such as a metal (single wire or braided) or a polymer, such as nylon or polycarbonate acrylonitrile butadiene styrene (polycarbonate ABS).

In operation, the forces exerted on the cords 252 and/or stiffeners 264, 266 place these elements in tension (hoop stress), thereby resisting outward expansion in the radial direction. By these mechanisms, the straight members 222 and 224 can retain a straighter shape when the bladder member 250 is pressurized to reduce the degree of roll away.

Referring to FIG. 12C, a bladder member 280 is depicted in an embodiment of the invention. In this embodiment the interior chamber 110 is bounded by the arcuate member 226 and two other arcuate members 282 and 284 that define a convex curvature relative to the interior chamber 110 when not pressurized. The arcuate members 282 and 284 can have a tendency to straighten out when the interior chamber 110 is under pressure, thereby tending to deflect outward, towards the registration surfaces of the face and base portions 92 and 90. The straightening of the arcuate members 282 and 284 can militate against roll away.

Referring to FIG. 13, a seating gasket 290 having a substantially solid cross section 292 or a core material 293 can be utilized instead of a bladder member as the mask registration member 91. In one embodiment, the seating gasket is made of a porous material, such as neoprene foam, urethane foam or micro-cellular polyurethane foams, such as PORON. A registration surface 294 with a skin 296 can also be provided, against which the mask under test is seated. In other embodiments, the seating gasket 290 can comprise a soft rubber material, such as silicone or urethane rubber, that is substantially compliant to contact forces. The foams are conducive to a casting process, whereas the rubber materials are generally suited for an injection molding process. Because there is no interior chamber, the seating gasket 290 can utilize a single flange portion 298 that is captured between the base and face portions 90 and 92.

The seating gasket 290 can comprise a unitary piece formed, for example, by a casting or injection molding process. In one embodiment, the mold in which the seating gasket 290 is formed can be coated or otherwise layered with the material for the skin 296 that then adheres to the core material 293. In other embodiments, the seating gasket can comprise two or more pieces that are cut or otherwise formed from standard stock (e.g., slabs or blocks) and joined together, for example, by a gluing or fusion process. The skin 296 can be pre-formed on the stock material, or applied after formation by a coating, adhesion or lamination process.

Functionally, where the core material 293 is porous, the skin 296 provides a leak-tight barrier against which the interface seal of the mask can be seated for a leak tight seal. The skin or rubber materials can be treated using the methods described above for enhanced surface lubrication. Where a soft or closed-cell rubber material is used, the need for the skin might not be required to affect a seal. However, because of the sticky nature of some soft rubber materials (e.g., silicone), the skin 296 can provide a barrier for lubrication that prevents creasing.

In operation, a mask is fitted to the head form so that the interface seal (e.g., numerical reference 151 of FIG. 7) of the mask is firmly seated on the seating gasket 290. In contrast to the bladder members disclosed herein, the seating gasket 290 is not inflated to provide conformance to the contour of the interface seal. Rather, the mask is tightened onto the head form 27 so that the interface seal of the mask under test sinks into the compliant material of the seating gasket 270. The tightening of the mask may be accomplished by strapping the mask onto the full head form 27 or, where a full head form is not utilized, by adjustment of clips (e.g., clip assemblies 140 of FIG. 3). The tightening of the mask causes the seating gasket 290 to conform to the contour of the interface seal of the mask under test.

The seating gasket 290 provides a seal between the mask under test and the head form 27 without need for inflation and the complexities attendant thereto. For example, a seating gasket 290 eliminates the need for an inflation source passage, and also eliminates the problems of lift away and roll away. Therefore, the configuration of seating gasket 290, as well as the head form 27 can be simplified due to the absence of inflation and the associated problems of lift away and roll away.

The foregoing descriptions present numerous specific details that provide a thorough understanding of various embodiments of the present invention. It will be apparent to one skilled in the art that various embodiments, having been disclosed herein, may be practiced without some or all of these specific details. In other instances, known components have not been described in detail in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention.

For example, the various aspects presented in FIGS. 12A through 12C are not limited to the combinations of their respective depictions. That is, aspects presented in FIG. 12A may be implemented standing alone (e.g., interlocking flanges without increased thicknesses of the straight members) or in combination with one or more of the aspects presented in FIG. 12B or 12C (e.g., interlocking flanges in combination with stiffeners or arcuate members).

For purposes of interpreting the claims for the present invention, it is expressly intended that the provisions of Section 112, sixth paragraph of 35 U.S.C. are not to be invoked with respect to a given claim unless the specific terms "means for" or "step for" are recited in that claim.

What is claimed is:

1. A head form assembly for testing a respirator, comprising:
    a face portion having an outer perimeter;
    a base portion that cooperates with at least a portion of said outer perimeter of said face portion to define a recess adjacent said face portion; and
    a mask registration member disposed within said recess, said mask registration member being comprised of a base material and presenting a continuous registration surface for seating said respirator, said continuous registration surface being comprised of a lubricious material having greater lubricity than said base material.
2. The head form assembly of claim 1, wherein said mask registration member is a bladder member.
3. The head form assembly of claim 2 further comprising a structure that restricts outward radial expansion of at least a portion of said bladder member.
4. The head form assembly of claim 1 wherein said lubricious material comprises an additive diffused from said mask registration member.
5. The head form assembly of claim 4 wherein said additive is paraffin wax.
6. The head form assembly of claim 1 wherein said lubricious material comprises a coating.
7. The head form assembly of claim 6 wherein said coating comprises a polytetrafluoroethylene material.
8. The head form assembly of claim 1 wherein said lubricious material is a coating that comprises polytetrafluoroethylene.
9. A method of assembling a head form assembly for a mask fit tester, comprising:
    providing a mask registration member comprising a base material and defining a registration surface adapted to interface a respirator, said registration surface having greater lubricity relative to said base material;
    providing a face portion of a head form and a base portion of said head form, said face portion and said base portion defining a continuous interface therebetween, said mask registration member being adapted for coupling to said head form between said face portion and said base portion at said interface;
    assembling said face portion, said base portion and said mask registration member so that said mask registration member is disposed between said face portion and said base portion at said interface; and
    attaching said face portion to said base portion with said mask registration member between said face portion and said base portion at said interface to secure said mask registration member to said head form.
10. The method of claim 9 wherein said greater lubricity of said registration surface provided in the step of providing said mask registration member is provided by an additive that is mixed with said base material prior to formation of said mask registration member.
11. The method of claim 10 wherein said additive diffuses to the surface by a blooming process.
12. The method of claim 11 wherein said blooming process is accelerated by maintaining the temperature of said mask registration member at a temperature of approximately 10° Celsius or lower for a period of approximately 24 hours.
13. The method of claim 12 wherein said additive is selected for the group consisting of paraffin wax, naphthene, polyethylene wax, microcrystalline waxes and normal chain hydrocarbons having from 26 to 29 carbon atoms, and wherein said base material is selected from the group consisting of butyl rubber, buna rubber, and thermoplastic elastomers.
14. The method of claim 9 wherein said mask registration member provided in the step of providing said mask registration member comprises a bladder member.
15. The method of claim 14 wherein said mask registration member provided in the step of providing said mask registration member is configured to restrict outward radial expansion of at least said portion of said bladder member.

* * * * *